(12) United States Patent
Kasper et al.

(10) Patent No.: US 9,533,644 B2
(45) Date of Patent: Jan. 3, 2017

(54) SYSTEM FOR DETECTING WHEN A VEHICLE OCCUPANT EXITS THE VEHICLE, SYSTEM FOR ACTIVATING OR DEACTIVATING A FUNCTION IN A VEHICLE AND CORRESPONDING VEHICLE

(71) Applicant: GM GLOBAL TECHNOLOGY OPERATIONS LLC, Detroit, MI (US)

(72) Inventors: Mario Kasper, Ruesselsheim (DE); Christian Steinert, Filsen (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 12 days.

(21) Appl. No.: 14/320,173

(22) Filed: Jun. 30, 2014

(65) Prior Publication Data

US 2015/0014082 A1 Jan. 15, 2015

(30) Foreign Application Priority Data

Jun. 28, 2013 (DE) .................... 20 2013 005 826 U (51) Int. Cl.
| | | |
|---|---|---|
| *B60R 21/015* | (2006.01) | |
| *B60T 17/22* | (2006.01) | |
| *B60T 7/12* | (2006.01) | |
| *B60T 7/14* | (2006.01) | |
| *B60T 13/74* | (2006.01) | |

(52) U.S. Cl.
CPC ............... *B60R 21/015* (2013.01); *B60T 7/12* (2013.01); *B60T 7/14* (2013.01); *B60T 13/74* (2013.01); *B60T 17/22* (2013.01); *B60R 21/01512* (2014.10)

(58) Field of Classification Search
CPC .............. B60T 7/12; B60T 7/14; B60T 13/74; B60T 17/18; B60T 17/22; B60R 21/015; B60R 21/01512
See application file for complete search history.

(56) References Cited

U.S. PATENT DOCUMENTS

| 2003/0004628 A1* | 1/2003 | Rennaker .......... B60R 21/01556 701/45 |
| 2003/0149517 A1* | 8/2003 | Murphy ............ B60R 21/01522 701/45 |

(Continued)

FOREIGN PATENT DOCUMENTS

| DE | 19919675 A1 | 11/2000 |
| DE | 10009540 A1 | 9/2001 |

(Continued)

OTHER PUBLICATIONS

Machine translation of DE10009540(A1). [Retrieved from the Internet on Sep. 4, 2015].*

*Primary Examiner* — Barry Gooden, Jr.
(74) *Attorney, Agent, or Firm* — Lorenz & Kopf LLP (57) ABSTRACT

A system for detecting when a vehicle occupant exits the vehicle is disclosed. The system includes a sensor device is configured to measure an acceleration of the vehicle along one direction or accelerations of the vehicle along several directions and to make available a time-dependent signal(s) that represents the acceleration(s). The system also includes an evaluation device configured to evaluate the time-dependent signal(s) in a way to ascertain whether the signal(s) contains a sequence of acceleration values characteristic of the occupant exiting the vehicle.

9 Claims, 7 Drawing Sheets

(56) References Cited

U.S. PATENT DOCUMENTS

| | | | | |
|---|---|---|---|---|
| 2003/0151239 A1* | 8/2003 | Murphy | ............ | B60R 21/01532 280/735 |
| 2005/0040937 A1* | 2/2005 | Cuddihy | .............. | G08B 25/016 340/436 |
| 2005/0288842 A1* | 12/2005 | Brewer | ................ | B60G 17/018 701/70 |
| 2006/0151227 A1* | 7/2006 | Reith | ...................... | B60N 2/002 180/273 |
| 2006/0163912 A1* | 7/2006 | Gale | ........................ | B60J 5/065 296/190.11 |
| 2007/0096445 A1* | 5/2007 | Breed | .................... | B60N 2/002 280/735 |
| 2008/0294319 A1* | 11/2008 | Baijens | ...................... | B60T 8/24 701/70 |
| 2009/0076664 A1* | 3/2009 | McCabe | .................... | B60L 3/02 701/2 |
| 2011/0246021 A1* | 10/2011 | Prokhorov | .............. | B60T 7/122 701/36 |
| 2012/0018240 A1* | 1/2012 | Grubaugh | ................. | B60T 7/14 180/273 |
| 2012/0130604 A1* | 5/2012 | Kirshon | .............. | F02N 11/0822 701/51 |
| 2012/0161508 A1* | 6/2012 | Beever | ...................... | B60T 7/12 303/191 |
| 2012/0325573 A1* | 12/2012 | Miller | ...................... | B60L 7/24 180/282 |
| 2013/0131925 A1* | 5/2013 | Isaji | ......................... | B62D 6/00 701/41 |
| 2014/0195116 A1* | 7/2014 | Hrovat | .................. | B60W 10/06 701/38 |
| 2015/0114771 A1* | 4/2015 | Putz | ....................... | B60T 7/042 188/158 |

FOREIGN PATENT DOCUMENTS

| | | |
|---|---|---|
| DE | 10323976 A1 | 12/2004 |
| DE | 102004057679 A1 | 6/2006 |
| DE | 102009057625 A1 | 6/2011 |

* cited by examiner

SYSTEM FOR DETECTING WHEN A VEHICLE OCCUPANT EXITS THE VEHICLE, SYSTEM FOR ACTIVATING OR DEACTIVATING A FUNCTION IN A VEHICLE AND CORRESPONDING VEHICLE

CROSS REFERENCE TO RELATED APPLICATION

This application claims priority to German Patent Application No. 202013005826.9 filed Jun. 28, 2013, which is incorporated herein by reference in its entirety.

TECHNICAL FIELD

The technical field pertains to an arrangement for detecting when a vehicle occupant exits the vehicle, an arrangement for activating or deactivating a function in a vehicle and a corresponding vehicle.

BACKGROUND

Although the present disclosure can be advantageously utilized in various types of vehicles, the problem to be solved with the present disclosure is elucidated below using the example of a motor vehicle in the form of an automobile with an electric parking brake.

In vehicles with an electric parking brake such as an electromechanical or electrohydraulic parking brake, a control element to be actuated by the driver of the vehicle such as a switch or button may be provided in the interior of the vehicle, wherein said control element is actuated by the driver when the vehicle is parked in order to activate the parking brake and to thusly prevent the vehicle from rolling away, for example, if it is parked on an incline.

In this context, it may be desirable to assist the driver of the vehicle to the effect that suitable measures are taken in case the driver forgets to activate the electric parking brake when exiting the vehicle, particularly in order to prevent the vehicle from rolling away.

For example, DE 103 23 976 A1 describes a method for activating or deactivating at least one function in a motor vehicle, in which the position of at least one identification transmitter is determined independently of a triggering event and at least one function of the motor vehicle is activated or deactivated in dependence on at least the determined position of the identification transmitter. If a) only one identification transmitter is detected and it is furthermore determined that this identification transmitter currently exits the vehicle or if b) it is determined that the driver's seat is not occupied and it is determined in addition to a) or b) that the vehicle has a speed other than zero, DE 103 23 976 A1 proposes to activate one or more of the following functions: decelerating the vehicle, shifting an automatic transmission into the parking position, engaging a gear in an automated gear box and/or engaging the electric parking brake.

SUMMARY

In light of these circumstances, the present disclosure is based on the objective of detecting when a vehicle occupant, particularly the driver, exits the vehicle with additionally improved reliability and additionally improved accuracy. According to another aspect of the present disclosure, it should be possible to activate or deactivate the respectively desired function of the vehicle with additionally improved reliability in case an occupant, particularly the driver, exits the vehicle. According to yet another aspect of the present disclosure, a corresponding additionally improved vehicle should be disclosed.

These objectives are attained by means of an arrangement with the characteristics of claim 1, by means of an arrangement with the characteristics of claim 7 and/or by means of a vehicle with the characteristics of claim 10.

Accordingly, the present disclosure proposes an arrangement for detecting when a vehicle occupant exits the vehicle. The arrangement can preferably be used in a motor vehicle. The arrangement features a sensor device and an evaluation device. The sensor device is designed for measuring an acceleration of the vehicle along one direction or accelerations of the vehicle along several directions and for making available a time-dependent signal that represents the acceleration or several time-dependent signals that represent the accelerations. Furthermore, the evaluation device is designed for evaluating the signal or the signals in a way that makes it possible to ascertain whether the signal contains a sequence of acceleration values that is characteristic for the occupant exiting the vehicle or whether the signals respectively contain a sequence of acceleration values and these sequences are in combination characteristic for the occupant exiting the vehicle.

The present disclosure furthermore proposes an arrangement for activating or deactivating a function in a vehicle, particularly a motor vehicle, in dependence on an occupant exiting the vehicle. In this context, the term occupant refers, in particular, to the driver of the vehicle. The arrangement features an arrangement for detecting when a vehicle occupant, particularly the driver, exits the vehicle, namely an arrangement of the type proposed in accordance with one aspect of the present disclosure. In the arrangement for activating or deactivating a function in the vehicle, the evaluation device is designed for transmitting a command to the control device for the function in the vehicle in order to activate or deactivate the function depending on whether the evaluation by means of the evaluation device shows that the pattern of the signal contains a component that is characteristic for the occupant exiting the vehicle or the patterns of the signals contain in combination components that are characteristic for the occupant exiting the vehicle. Alternatively, the evaluation device is also realized in the form of the control device for the function in the vehicle or forms part of such a control device and is designed for activating or deactivating the function depending on whether the evaluation by means of the evaluation device shows that the pattern of the signal contains a component that is characteristic for the occupant exiting the vehicle or the patterns of the signals contain in combination components that are characteristic for the occupant exiting the vehicle.

The present disclosure furthermore proposes a vehicle, particularly a motor vehicle, that features such an arrangement for detecting when a vehicle occupant exits the vehicle and/or such an arrangement for activating or deactivating a function in the vehicle.

The central idea of the present disclosure consists of utilizing an acceleration signal or several acceleration signals that is/are representative of vehicle accelerations and acquired by means of a suitable sensor device for detecting when a vehicle occupant, particularly the driver, exits the vehicle.

It was surprisingly determined that the evaluation of acceleration signals of the type frequently made available in the vehicle by already existing sensors or measuring assemblies, particularly a yaw rate sensor unit providing data for the vehicle stability control system, makes it possible to conclude whether an occupant, particularly the driver, has exited the vehicle, and that this evaluation can also make it possible to additionally improve a conclusion whether the occupant has exited the vehicle, which was already drawn based on other information, with respect to its accuracy and reliability. Such additional information may, for example, consist of any combination of information on the opening state of a vehicle door, particularly the driver's door, information on the on/off state of the vehicle ignition, information on whether the ignition key is inserted into or removed from an ignition lock of the vehicle, information on the presence of a transponder of a keyless entry system of the vehicle within a reception range of the keyless entry system or on the position of the transponder, information on the locking state of a central locking system of the vehicle, level information of a headlight sensor system of the vehicle, a speed signal that is representative of the moving speed of the vehicle or a pressure pattern signal that is representative of a tire pressure, particularly a time history of the tire pressure, in a tire of a wheel of the vehicle or several pressure pattern signals that are representative of the tire pressures, particularly time histories of the tire pressures, in the tires of several wheels of the vehicle, particularly in all wheels.

Advantageous embodiments and enhancements result from the dependent claims, as well as the description with reference to the drawings.

In a preferred embodiment, the sensor device is designed for measuring a longitudinal acceleration of the vehicle and a lateral acceleration of the vehicle and for making available a first time-dependent signal that is representative of the longitudinal acceleration, as well as a second time-dependent signal that is representative of the lateral acceleration. In this embodiment, the evaluation device is furthermore designed for evaluating the first signal and the second signal in a way that makes it possible to ascertain whether the first signal contains a sequence of longitudinal acceleration values and the second signal contains a sequence of lateral acceleration values and whether these sequences are in combination characteristic for the occupant exiting the vehicle. The evaluation of the longitudinal and lateral acceleration signals is advantageous because a characteristic signal pattern with a characteristic sequence of longitudinal and lateral acceleration values results when an occupant, particularly the driver, exits the vehicle, wherein this characteristic signal pattern can be assigned to the occupant with adequate reliability and distinguished from the signal patterns generated when other occupants exit the vehicle or during rocking motions of occupants within the vehicle. In other words, if the driver exits the vehicle and during this process places the foot on the ground, this manifests itself in the signal patterns that are representative of the longitudinal and the lateral acceleration in the form of a characteristic "fingerprint" of sorts.

In another preferred embodiment, the sensor device is designed for simultaneously measuring the longitudinal acceleration of the vehicle and the lateral acceleration of the vehicle, wherein this advantageously makes it possible to measure an occurring signal pattern that is characteristic for the occupant exiting the vehicle as thoroughly as possible.

In another embodiment, the arrangement features a detection device for detecting the opening state of a vehicle door assigned to the occupant, particularly the driver's door of the vehicle. In this case, the evaluation device is designed for carrying out the evaluation of the signal or the signals in dependence on the detected opening state of the vehicle door assigned to the occupant. The evaluation device may be designed, in particular, for carrying out the evaluation of the signal or the signals when the detection device signals that the vehicle door, particularly the driver's door, is open. In this way, it can be ensured that the evaluation of the signal or the signals takes place when it is actually possible to exit the vehicle, namely when the vehicle door is open, and that the pattern of the signal or the signals therefore should be monitored to the effect whether the occupant actually exits the vehicle.

In one embodiment, the detection device may be realized in the form of a door switch or a door contact that detects when the door is opened.

In one embodiment, the occupant is the driver of the vehicle and the arrangement is designed for detecting when the driver exits the vehicle. This is particularly advantageous if the parking brake should be activated in dependence on the detection of the driver exiting the vehicle because the manual activation of the electric parking brake, if so required, is typically the responsibility of the driver.

In one embodiment, the sensor device is realized as part of a measuring arrangement or measuring assembly that is designed and provided, in particular, for making available data for a stability control system of the vehicle. The sensor device may be realized, in particular, as part of a yaw rate sensor unit. This embodiment has the advantage that it is possible to use signals, which are acquired and made available by sensors that are already installed as standard equipment in many vehicles, for detecting when the occupant exits the vehicle. For example, the costs for additional sensors can thusly be avoided.

In one embodiment of the arrangement for activating or deactivating a function in a vehicle, the evaluation device is designed for processing additional information made available by one or more other data sources and for activating or deactivating the function depending on this additional information of one or more other data sources and depending on whether the evaluation by the evaluation device shows that the pattern of the signal contains a component that is characteristic for the occupant exiting the vehicle or the patterns of the signals contain in combination components that are characteristic for the occupant exiting the vehicle. Instead of activating or deactivating the function itself, the evaluation device may transmit a command to the control device for the function in order to initiate the activation or deactivation of the function by the control device. The additional information that can be processed by the evaluation device in accordance with this embodiment may, in particular, consist of any of the following information, all of the following information or some of the following information in any combination: information on the on/off state of the vehicle ignition; information on whether the ignition key is inserted into or removed from an ignition lock of the vehicle; information on the presence of a transponder of a keyless entry system of the vehicle within a reception range of the keyless entry system or on the position of the transponder such as, for example, information on whether the transponder is located in the vehicle interior or outside of the vehicle; information on the locking state of a central locking system of the vehicle; level information of a headlight sensor system of the vehicle; a speed signal that is representative of the moving speed of the vehicle; and a pressure pattern signal that is representative of a tire pressure, particularly a time history of the tire pressure, in a tire of a wheel of the vehicle or several pressure pattern signals that are representative of the tire pressures, particularly time histories of the tire pressures, in the tires of several wheels of the vehicle, particularly in all wheels.

This additional information can be advantageously utilized in any combination for activating or deactivating a function in a particularly reliable fashion when an occupant, particularly the driver, has exited the vehicle. This embodiment makes it possible to further improve the overall reliability of the arrangement.

In one embodiment, the arrangement for activating or deactivating a function in a vehicle is designed for activating an electric parking brake of the vehicle in dependence on the result of the evaluation. This embodiment makes it possible to prevent the vehicle from inadvertently rolling away with improved reliability, e.g. if it is parked on an incline and the driver forgets to activate the parking brake before exiting the vehicle.

The aforementioned embodiments can be combined with one another in any sensible way. Other potential embodiments, enhancements and implementations of the present disclosure also comprise combinations of inventive characteristics that are not explicitly mentioned with reference to the exemplary embodiments described above and below. In this respect, a person skilled in the art may, in particular, also add individual aspects in order to improve or supplement the respective basic embodiment of the present disclosure.

BRIEF DESCRIPTION

The present disclosure is described in greater detail below with reference to exemplary embodiments that are illustrated in the schematic drawings. In these drawings.

The attached drawings are intended to further elucidate the embodiments of the present disclosure. They show exemplary embodiments and in conjunction with the description serve for explaining the principles and concepts thereof. Other embodiments and many of the aforementioned advantages result with reference to the drawings. The elements in the drawings are not necessarily illustrated true-to-scale.

In the drawings, identical elements, characteristics and components, as well as elements, characteristics and components that function and operate in the same way, are respectively identified by the same reference symbols—if not indicated otherwise.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
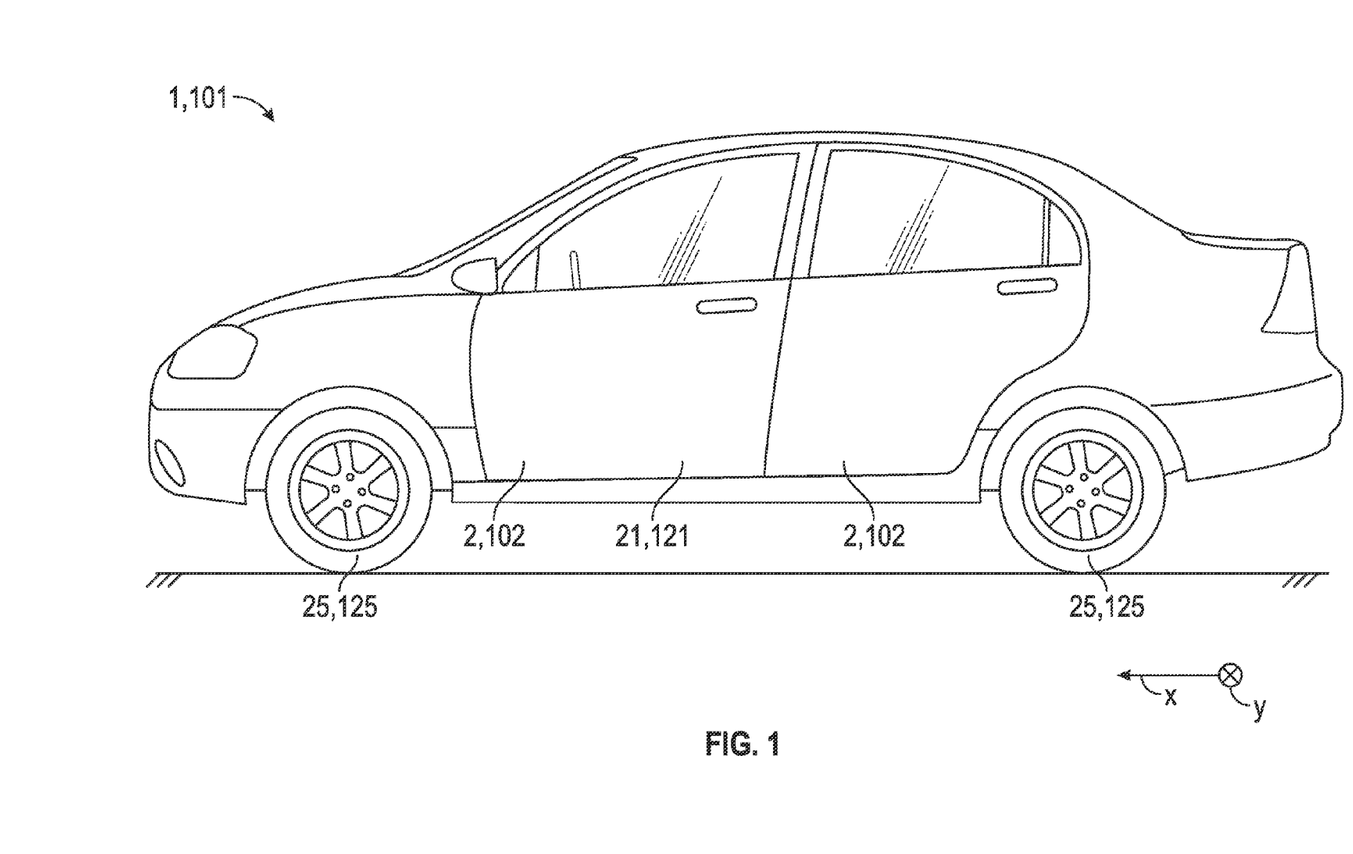
FIG. 1 shows a schematic representation of a vehicle realized in the form of an automobile according to a first and a second exemplary embodiment of the present disclosure.

FIG. 1 schematically shows a vehicle 1 according to a first exemplary embodiment of the present disclosure in the form of an automobile, as well as a vehicle 101 according to a second exemplary embodiment. The respective vehicles 1 and 101 are illustrated with four doors in FIG. 1 and conventionally feature respective vehicle doors 2 and 102 for the vehicle occupants. The vehicle 1, 101 could also feature fewer or more vehicle doors 2, 102 such as, for example, two vehicle doors 2, 102 and a not-shown hatch. One of the respective doors 2 and 102 is assigned to the driver of the respective vehicle 1 or 101 and therefore represents the respective driver's door 21 or 121. The longitudinal direction of the vehicle is identified by the reference symbol x and the lateral direction of the vehicle is identified by the reference symbol y.

Figure 2:
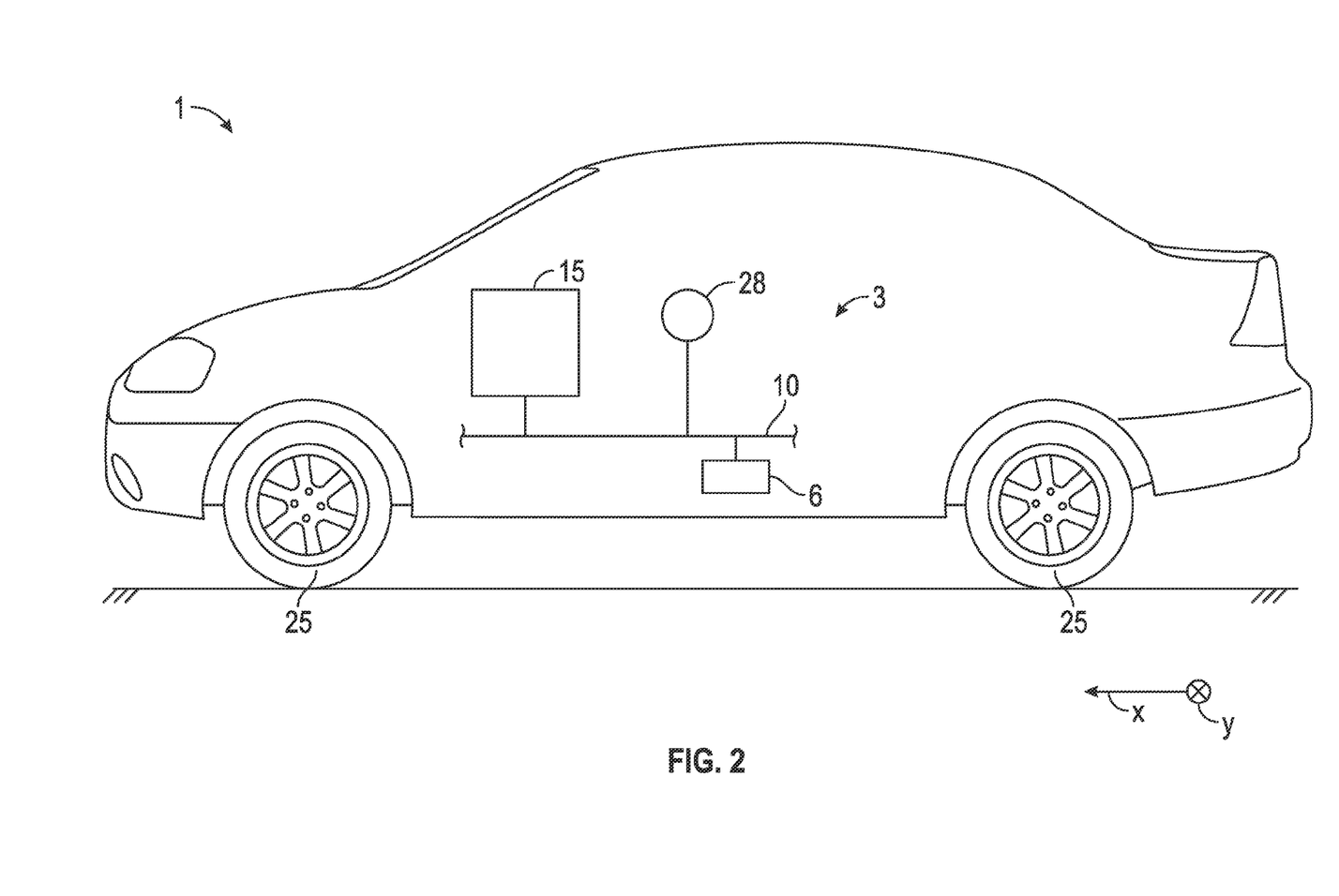
FIG. 2 shows a schematic representation of the vehicle according to the first exemplary embodiment in order to elucidate an arrangement that serves for detecting when the driver exits the vehicle.

According to FIG. 2, the vehicle 1 features an arrangement 3 that serves for detecting when the driver of the vehicle 1 exits the vehicle 1. The arrangement 3 features a sensor device 6 and an evaluation device 15 that are arranged in or on the vehicle 1.

The sensor device 6 is designed for detecting and measuring an acceleration ax of the vehicle 1 along the longitudinal direction x of the vehicle. The acceleration ax is referred to as longitudinal acceleration below. The sensor device 6 is furthermore designed for detecting and measuring an acceleration ay of the vehicle 1 along the lateral direction y, in particular, simultaneously with the longitudinal acceleration ax, wherein this acceleration along the lateral direction is referred to lateral acceleration below.

The vehicle 1 is equipped with a bus 10 that enables individual components within the vehicle 1 to communicate with one another. A first time-dependent signal S1 that is representative of the longitudinal acceleration ax and a second time-dependent signal S2 that is representative of the lateral acceleration ay are made available on the bus 10 by the sensor device 6. In this way, the accelerations ax and ay that are measured by the sensor device 6 and represented by the signals S1 and S2 can be evaluated by the evaluation device 15 connected to the bus 10.

Figure 5:
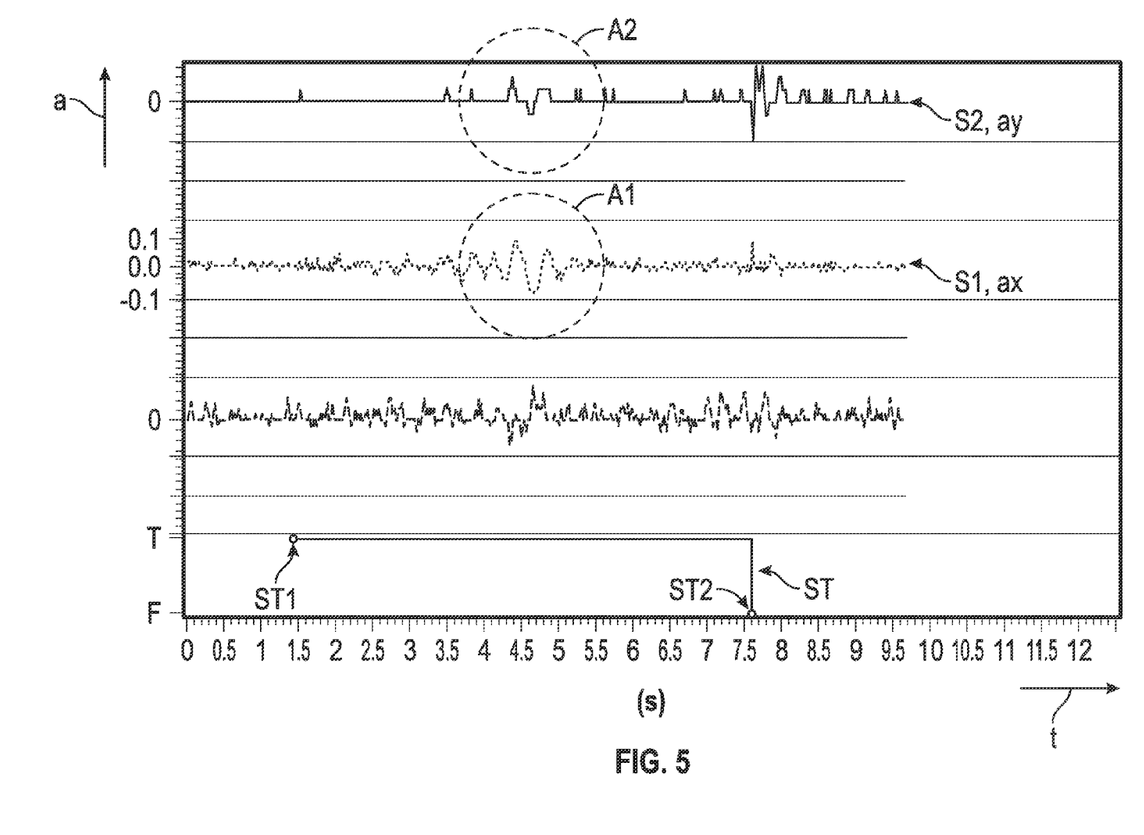
FIG. 5 shows a first example of time histories of lateral and longitudinal accelerations as they may occur when the driver exits the vehicle.
Figure 6:
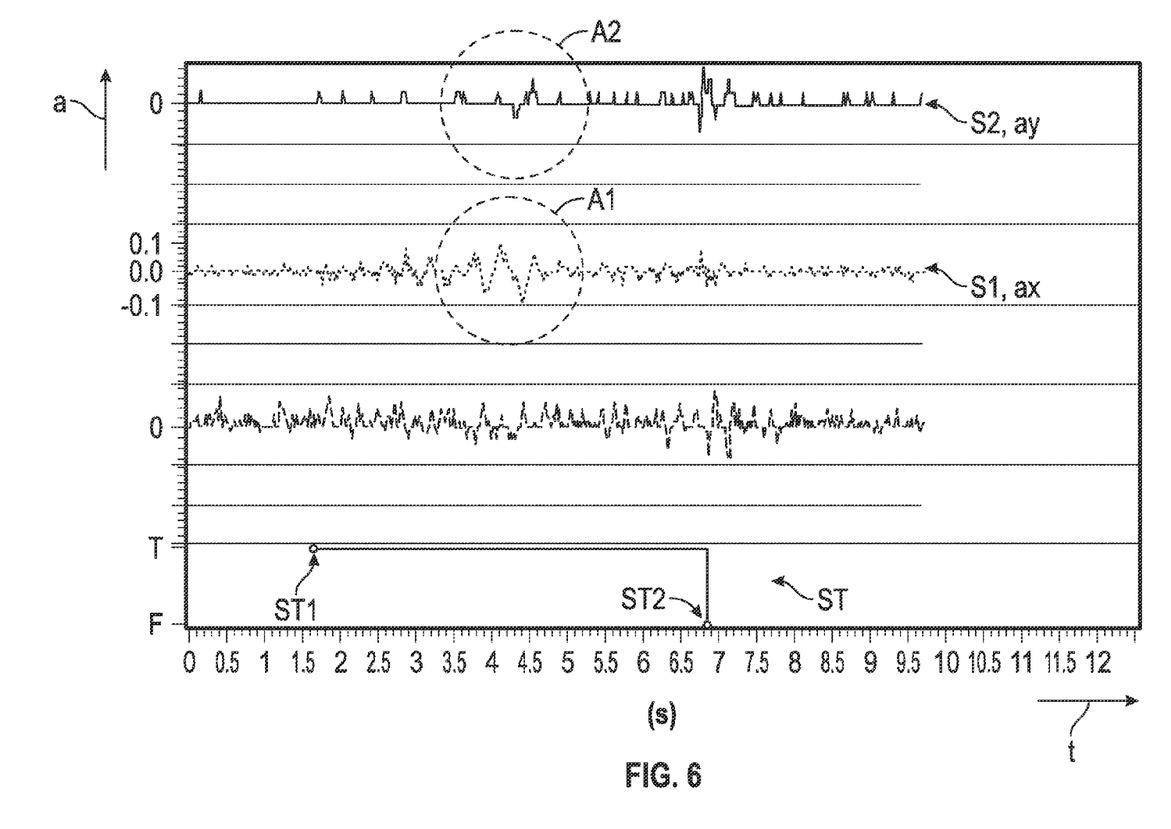
FIG. 6 shows a second example of time histories of lateral and longitudinal accelerations as they may occur when the driver exits the vehicle.
Figure 7:
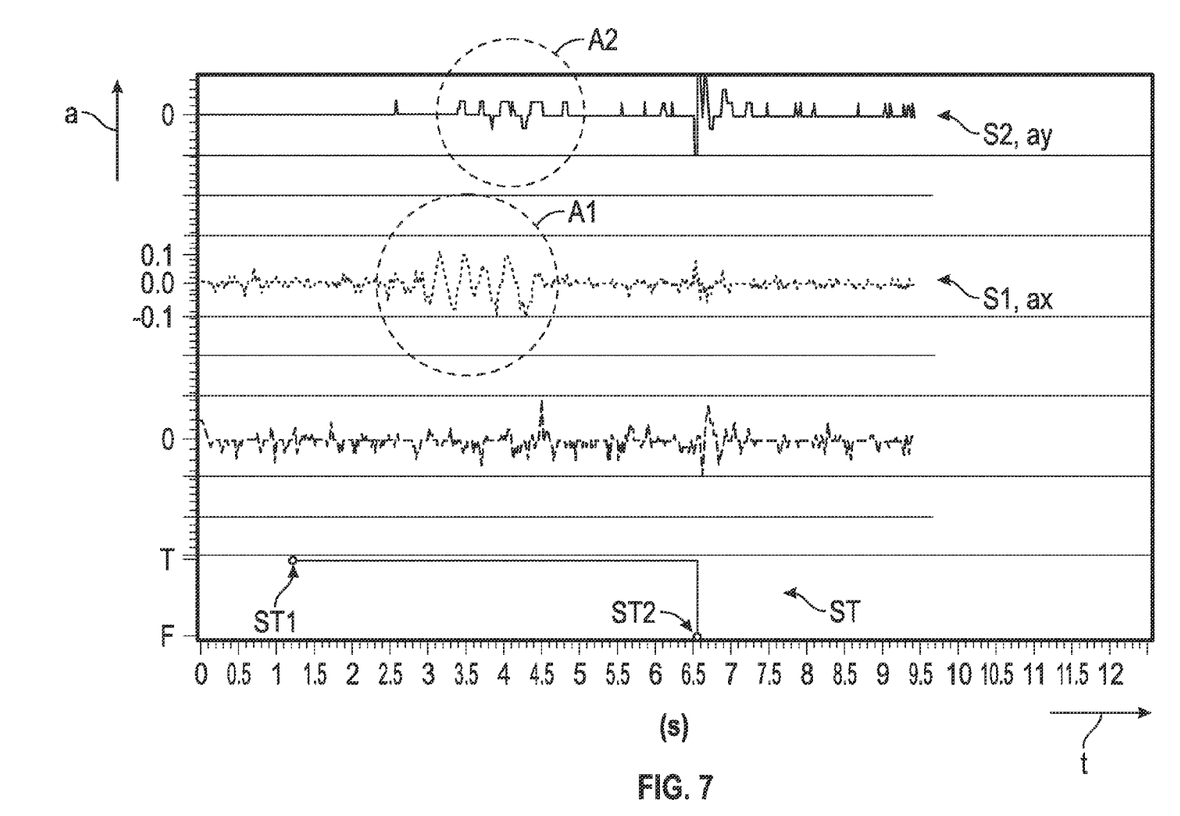
FIG. 7 shows a third example of time histories of lateral and longitudinal accelerations as they may occur when the driver exits the vehicle.

In FIGS. 5, 6 and 7, exemplary patterns of such signals S1 and S2 that were recorded during exemplary exiting tests are plotted in the form of acceleration values (in $m/s^2$) as a function of the time t (in seconds) in order to elucidate the signal patterns.

The sensor device 6 may be equipped, for example, with two acceleration sensors for detecting and measuring the longitudinal and lateral accelerations ax, ay of the vehicle 1, wherein these acceleration sensors are provided especially for the purpose of detecting when the driver exits the vehicle 1. However, it is preferred to utilize sensors or a sensor arrangement that is already installed in the vehicle 1 for a different purpose. For example, the sensor device 6 may be realized, for example, in the form of a measuring arrangement or measuring assembly (e.g., a yaw rate sensor unit) for detecting accelerations and angular speeds that is already installed in many vehicles in order to make available data for a stability control system or in the form of part of such a measuring arrangement or measuring assembly.

FIG. 2 also shows that the arrangement 3 features a detection device 28 that may be realized, for example, in the form of a door switch or a door contact. The detection device 28 detects the opening state of the driver's door 21. In FIGS. 5 to 7, the opening state of the driver's door 21 is illustrated in the form of the curve ST, wherein the opening of the driver's door 21 is identified by the reference symbol ST1 and the closing of the driver's door 21 is identified by the reference symbol ST2. The curve ST assumes two logical values T (true, "door open") and F (false, "door not open").

When the detection device 28 detects that the driver's door 21 is in the process of being opened, the detection device 28 makes available a corresponding signal that can be used, among others, by the evaluation device 15. As soon as the detection device 28 of the arrangement 3 signals that the driver's door 21 is in the process of being opened, the first and second signals S1 and S2 that are representative of the longitudinal and the lateral acceleration ax, ay of the vehicle 1 are evaluated by the evaluation device 15. The evaluation of the signals S1 and S2 is carried out in a way that makes it possible to ascertain whether the signals S1, S2 respectively contain a sequence A1 or A2 of acceleration values ax or ay that in combination and, for example, also with respect to their relative incidence in time are characteristic for the driver exiting the vehicle 1. Corresponding characteristic components of the signals S1, S2 are identified by the reference symbols A1, A2 in FIGS. 5-7. In this respect, the evaluation may include, for example, filtering of the signals S1, S2 and/or a frequency analysis of the signals S1, S2 and a comparison of the thusly obtained results with values, value patterns, spectrums, etc. that are typical for the driver exiting the vehicle 1 and may be stored in the evaluation device 15. However, the evaluation may also include processing of the signals S1, S2 by means other conventional methods. The evaluation may be concluded, for example, when the driver has once again closed the driver's door 21 and the detection device 28 has detected and signaled the closing of the driver's door to the evaluation device 15.

In one variation of this exemplary embodiment, it would be conceivable to evaluate only one of the signals S1 or S2 in the above-described fashion. According to the present disclosure, however, it is preferred to evaluate both signals S1 and S2.

In another variation, the evaluation of the first and the second signal S1 and S2 could also be started and subsequently stopped in dependence on the position of a transponder of a keyless entry system rather than with the aid of the detection device 28. It would also be conceivable to trigger the evaluation when the driver actuates or taps on a control element for an electric parking brake.

FIG. 3 once again shows the vehicle 1 according to the first exemplary embodiment of the present disclosure, but this figure also shows an electric parking brake 45 and a control device 36 for the electric parking brake 45 that may also be respectively arranged in or on the vehicle 1. Upon its activation, the electric parking brake 45 serves for preventing the vehicle 1 from rolling away, in particular, if the vehicle 1 is parked on an incline.

Figure 3:
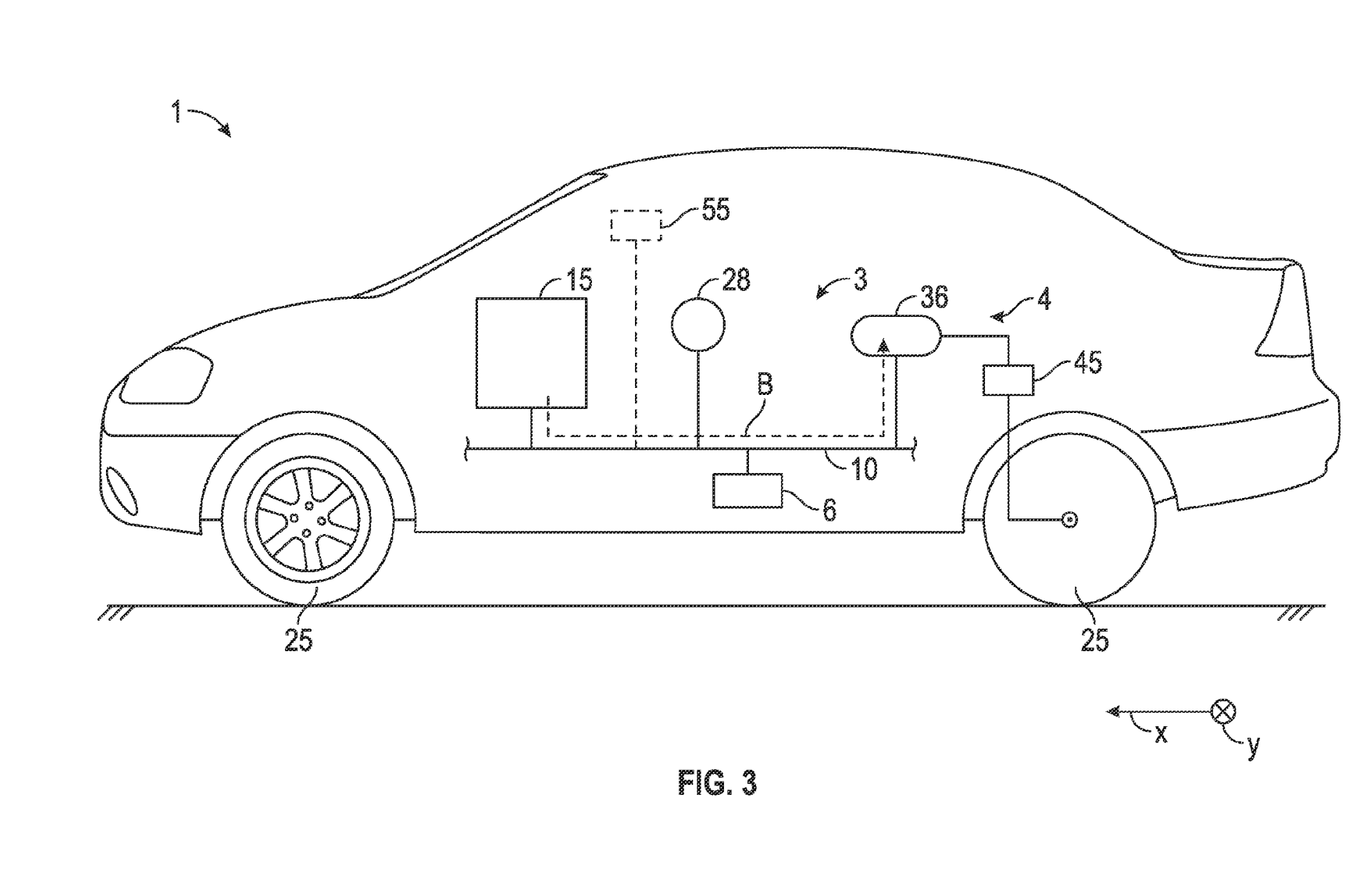
FIG. 3 shows a schematic representation of the vehicle according to the first exemplary embodiment in order to elucidate an arrangement that serves for activating an electric parking brake of the vehicle.

In the exemplary embodiment illustrated in FIG. 3, the control device 36, the parking brake 45 and the arrangement 3 according to FIG. 2 with the evaluation device 15, the sensor device 6, the detection device 28 and the bus 10 form components of an arrangement 4 for activating or deactivating a function in the vehicle 1, wherein the function to be activated consists of activating the parking brake 45 in the first exemplary embodiment shown. Consequently, the arrangement 4 according to FIG. 3 represents an arrangement for activating the parking brake 45 in dependence on the driver exiting the vehicle 1.

Depending on whether the evaluation by the evaluation device 15 shows that the patterns of the signals S1 and S2 contain in combination components that are characteristic for the occupant exiting the vehicle as described above with reference to FIG. 2, the evaluation device 15 transmits a command B to the control device 36 that activates the electric parking brake 45 in response to the command B and thusly secures the vehicle 1 from rolling away.

The evaluation of the first and second signals S1 and S2 made available on the bus 10 may be realized, for example, by executing an algorithm in the form of a program coded in a suitable programming language on a control device provided in the vehicle 1 or an electronic computer provided in the vehicle 1, wherein said algorithm carries out the evaluation of the signals S1, S2 in the above-described fashion when the driver's door 21 is opened.

Figure 4:
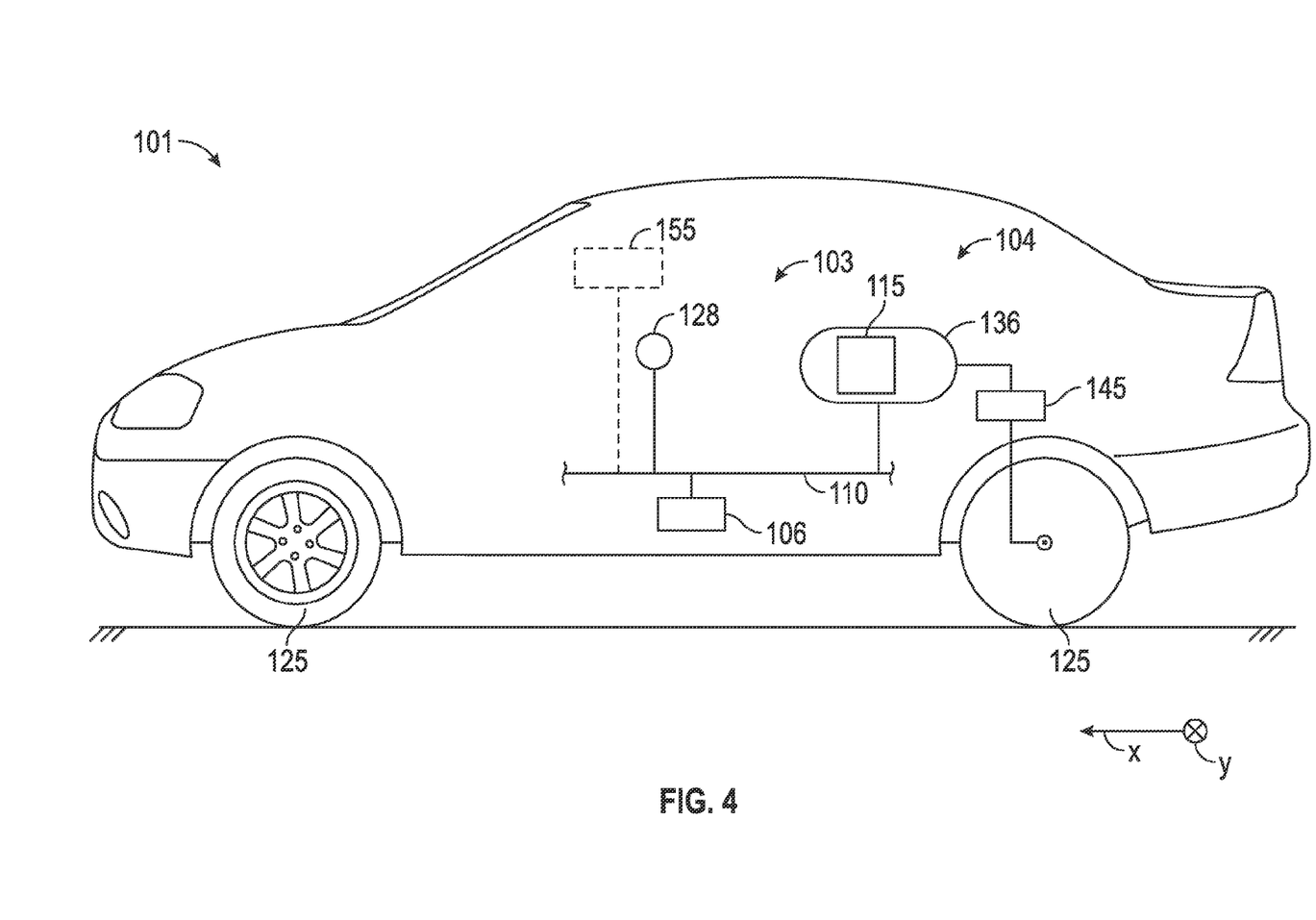
FIG. 4 shows a schematic representation of the vehicle according to the second exemplary embodiment in order to elucidate a variation of an arrangement for activating an electric parking brake of the vehicle.

The vehicle 101 according to the second exemplary embodiment of the present disclosure that is schematically illustrated in FIG. 4 also features an arrangement 103 with a sensor device 106, a bus 110, an evaluation device 115 and a detection device 128. In order to avoid repetitions, only the differences between the first and the second exemplary embodiment are described below.

In the second exemplary embodiment according to FIG. 4, the evaluation device 115 is simultaneously realized as part of a control device 136 for activating an electric parking brake 145 of the vehicle 101. In this preferred embodiment, the evaluation of the first and second signals S1 and S2, which are provided on the bus 110, may be realized in that the evaluation algorithm in the form of a program coded in a suitable programming language is installed and executed on a control unit that forms the control device 136 for the electric parking brake 145. In this example, the evaluation is therefore carried out in the above-described fashion with the aid of this control unit when the driver opens the driver's door 121 and the detection device 128 signals that the driver's door is opened.

FIGS. 3 and 4 also show in an exemplary fashion that the information on whether or not the driver has exited the respective vehicle 1 or 101, which was obtained by evaluating the signals S1 and S2 made available by the respective sensor device 6 or 106, can be additionally improved with respect to its reliability and accuracy in these exemplary embodiments by means of additional information made available by other respective data sources 55 or 155.

In this case, the respective evaluation device 15 or 115 and the algorithm for realizing the evaluation function may, in particular, be suitably realized for additionally processing any of the following information or some of the following information in any combination or all of the following information and combining the thusly processed information with the information obtained from the signals S1, S2 in the above-described fashion: information on the on/off state of the ignition of the respective vehicle 1 or 101; information on whether the ignition key is inserted into or removed from an ignition lock of the respective vehicle 1 or 101; information on the presence of a transponder of a keyless entry system of the respective vehicle 1 or 101 within a reception range of a component of the keyless entry system in the vehicle or on the position of the transponder such as, for example, the position of the transponder inside or outside the respective vehicle 1 or 101 determined with the aid of suitable antennas; information on the locking state of a central locking system of the respective vehicle 1 or 101; level information of a headlight sensor system of the respective vehicle 1 or 101; a speed signal that is representative of the moving speed of the respective vehicle 1 or 101; and a pressure pattern signal that is representative of a tire pressure, particularly a time history of the tire pressure, in a tire of a respective wheel 25 or 125 of the respective vehicle 1 or 101 or several pressure pattern signals that are representative of the tire pressures, particularly time histories of the tire pressures, in the tires of several wheels of the respective vehicle 1 or 101, particularly in all respective wheels 25 or 125, wherein such a pressure pattern signal or such pressure pattern signals can be made available by a tire pressure monitoring system in the respective vehicle 1 or 101.

The activation of the parking brake 45, 145 can then take place in dependence on the additional information taken into consideration and in dependence on the result of the evaluation of the signals S1, S2.

Vice versa, an assertion to the effect whether the driver has exited the respective vehicle 1 or 101, which was obtained based on the additional data made available by one or more of the respective other data sources 55 or 155 mentioned above, can be additionally improved with the aid of the evaluation of the longitudinal and lateral accelerations ax, ay represented by the respective signals S1 and S2.

According to the preceding abstract and detailed description, the present disclosure also discloses a method for detecting when a vehicle occupant exits the vehicle, as well as a method for activating or deactivating a function in a vehicle in dependence on an occupant exiting the vehicle, that can be respectively carried out with the described arrangements.

Although the present disclosure was completely explained in the preceding abstract and detailed description with reference to at least one preferred exemplary embodiment, it is not limited to this exemplary embodiment, but rather can be modified in many different ways. It goes without saying that the described exemplary embodiments are only examples and not intended to restrict the scope, applicability or configuration in any way. In fact, a person skilled in the art would find practical instructions for implementing at least one exemplary embodiment of the present disclosure in the abstract and the detailed description. It also goes without saying that it is possible to carry out numerous modifications that fall under the scope of the following claims and their legal equivalent.

The present disclosure particularly is not limited to an activation of a parking brake of a vehicle in dependence on information on a vehicle occupant, particularly the driver, exiting the vehicle that is based on the longitudinal and the lateral acceleration signals. In one variation, this information may, for example, be alternatively or additionally used for releasing a hatch of the vehicle and/or a fuel tank cover of the vehicle such that it can be opened and/or for storing a position of the vehicle determined with the aid of a GPS (global positioning system) or similar positioning system, for example, in order to alert the driver or vehicle owner in case of theft.

It is advantageous to utilize the yaw rate sensor unit that makes available data for a stability control system and is already installed in many vehicles for determining the acceleration values along the longitudinal direction of the vehicle and along the lateral direction of the vehicle because no additional sensors are required in this case. Instead of utilizing the signals made available by a yaw rate sensor unit, however, it would also be conceivable that the longitudinal and/or lateral acceleration of the vehicle is detected, measured and made available by one or more additional acceleration sensor(s) arranged at a suitable location in the vehicle.

In addition, the sensor device could also directly communicate with the evaluation device in order to make available the signals S1, S2 or the sensor device and the evaluation device could be integrated into a common component.

Furthermore, the present disclosure is not limited to detecting when the driver exits the vehicle, but could also be used for detecting when other occupants (e.g. the front seat passenger) exit the vehicle.

The invention claimed is:

1. A system for detecting when an occupant of a vehicle exits the vehicle comprising:
a sensor device configured to determine at least one of a longitudinal acceleration of the vehicle and a lateral acceleration of the vehicle and to output the determined at least one of the longitudinal acceleration of the vehicle and the lateral acceleration of the vehicle as a time-dependent signal representative solely of the determined at least one of the longitudinal acceleration of the vehicle and the lateral acceleration of the vehicle; and
an evaluation device configured to receive the time dependent signal from the sensor device and to determine when an occupant has exited the vehicle based solely upon the time-dependent signal.

2. The system according to claim 1, wherein the sensor device is configured to determine the longitudinal acceleration of the vehicle and the lateral acceleration of the vehicle and to output a first time-dependent signal that is representative of the longitudinal acceleration and a second time-dependent signal that is representative of the lateral acceleration, and wherein the evaluation device is configured to evaluate the first signal and the second signal to ascertain whether the first signal contains a sequence of longitudinal acceleration values and the second signal contains a sequence of lateral acceleration values which are in combination characteristic of the occupant exiting the vehicle.

3. The system according to claim 2, wherein the sensor device is configured to simultaneously measure the longitudinal acceleration of the vehicle and the lateral acceleration of the vehicle.

4. The system according to claim 1 wherein the sensor device comprises a part of a measuring system configured to output data to a stability control system of the vehicle.

5. The system according to claim 4 wherein the stability control system comprises a yaw rate sensor unit.

6. The system according to claim 1 further comprising a control device configure to control a vehicle function, wherein the evaluation device is further configured to transmit a command to the control device when the evaluation device determines that an occupant has exited the vehicle.

7. The system according to claim 6, wherein the system is configured to activate an electric parking brake of the vehicle as function in the vehicle in dependence on the result of the evaluation.

8. A vehicle comprising a system according to claim 1.

9. A system for detecting when an occupant of a vehicle exits the vehicle comprising:
a sensor device configured to determine a longitudinal acceleration of the vehicle and a lateral acceleration of the vehicle and to output the determined longitudinal acceleration of the vehicle and the lateral acceleration of the vehicle as a time-dependent signal representative solely of the determined longitudinal acceleration of the vehicle and the lateral acceleration of the vehicle; and an evaluation device configured to receive the time dependent signal from the sensor device and to determine when an occupant has exited the vehicle based solely upon the time-dependent signal.

\* \* \* \* \*